United States Patent [19]

Segawa

[11] Patent Number: 4,648,686
[45] Date of Patent: Mar. 10, 1987

[54] OPTICAL SWITCH ARRAY

[75] Inventor: Hideo Segawa, Tokyo, Japan

[73] Assignee: Ricoh Company, Ltd., Japan

[21] Appl. No.: 437,451

[22] Filed: Oct. 28, 1982

[30] Foreign Application Priority Data

Oct. 28, 1981 [JP] Japan ................................ 56-171341

[51] Int. Cl.$^4$ ................................................ G02B 6/10
[52] U.S. Cl. ................................ 350/96.13; 350/96.14
[58] Field of Search ............... 350/96.11, 96.12, 96.13,
350/96.14, 96.15, 96.29, 353, 354, 393

[56] References Cited

U.S. PATENT DOCUMENTS

| | | | |
|---|---|---|---|
| 3,819,250 | 6/1974 | Kibler | 350/96.29 |
| 4,236,156 | 11/1980 | Eden | 350/353 X |
| 4,384,761 | 5/1983 | Brady et al. | 350/96.20 |

OTHER PUBLICATIONS

"High Speed Cutoff Modulator using a Ti-Diffused LiNbo$_3$ Channel Waveguide", by Neyer et al., *Appl. Phys. Lett.*, 35(3), Aug. 1, 1979.

"Optical Bistability in LiNbo$_3$ using a Monolithically Integrated Directional Coupler", European Conference, London, Integrated Phy., pp. 61-62. Sep. 14-16, 1981.

"Temperature Dependence of the Optical Properties of Ferroelectric LiNbo$_3$ and LiTao$_3$", by Miller et al., vol. 9, #4, Applied Phys. Letter, Aug. 15, 1979.

*Primary Examiner*—William L. Sikes
*Assistant Examiner*—Akm E. Ullah
*Attorney, Agent, or Firm*—Guy W. Shoup

[57] ABSTRACT

An optical switch array including a substrate in the main surface of which is formed a plurality of inlet waveguides arranged side-by-side with a predetermined pitch and a like plurality of outlet waveguides each arranged in line with the corresponding inlet waveguide with a gap therebetween is provided. The gap is filled with a material having a temperature dependent index of refraction, which is lower in value than the waveguides at normal temperature but becomes comparable in value to the waveguide when heated thereby optically coupling the paired inlet and outlet waveguides.

10 Claims, 19 Drawing Figures

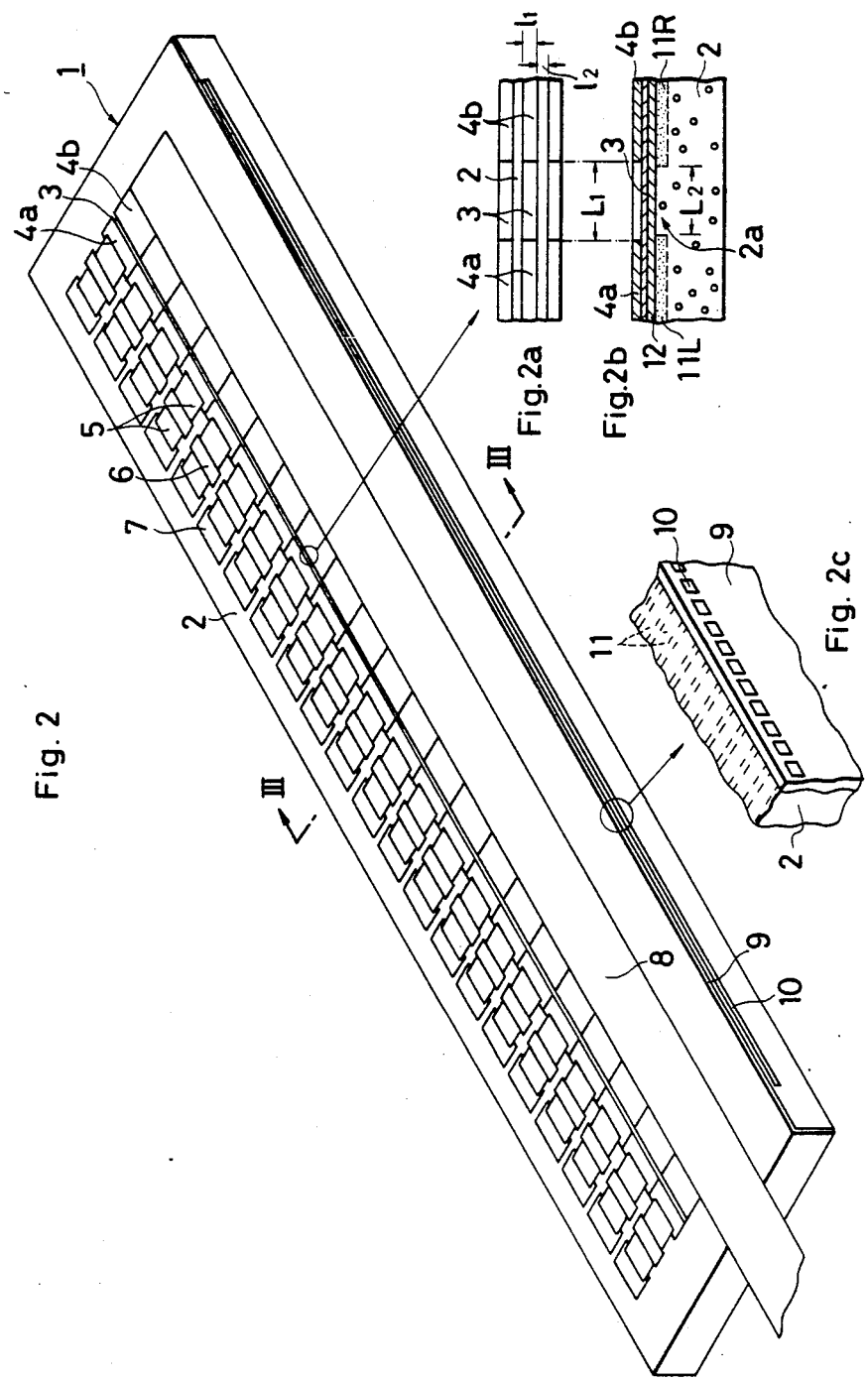

OPTICAL SWITCH ARRAY

BACKGROUND OF THE INVENTION

1. Field of the Invention

This invention relates to an optical switch array, and in particular, to such an optical switch array utilizing the temperature dependent characteristics of the index of refraction of a dielectric crystalline material.

2. Description of the Prior Art

In optically modulating apparatuses, optical shutters, applied instruments thereof, and electrophotographic copiers and printers, it is required to provide a device for optically recording image information at high speed. As an example of such a device, an optical switch array including a plurality of optical switches which are arranged in the form of a single array and selectively operated to be on or off in accordance with an electrical image signal supplied thereto is well known. The prior art optical switch arrays utilize either the magnetooptic effect or the electrooptic effect in carrying out the switching operation. For example, in the former case, use is typically made of a single crystal or epitaxial film of $Gd_{3-x}Bi_xFe_{5-x}Ga_yO_{12}$ and the on/off control of light is effected by utilizing the magnetooptic effect of such a single crystal or thin film. On the other hand, in the latter case, use is typically made of a ceramic material of PLZT having a crystalline structure expressed by $(Pb_{1-x}La_x)(Zr_{1-y}Ti_y)_{1-x/4}O_3$ and its secondary electrooptic effect, so-called Kerr effect, is utilized to carry out the on/off control of light as disclosed in the Japanese Patent Laid-open Publication No. 52-8842.

However, in the case where the magnetooptic effect is to be used, it is laborious to manufacture a single crystal or thin film of $Gd_{3-x}Bi_xFe_{5-x}Ga_yO_{12}$ and thus difficulty is encountered if it is desired to make such a crystal or film having a larger area. Further, in order to carry out switching operation, it is necessary to increase the temperature above the compensated temperature by 20° to 30° C. and to apply a magnetic field having the strength of approximately 100 ersteds. It is also necessary to provide input and output polarizers which will decrease light intensity and cause complication in overall device structure.

In the case where the electrooptic effect is to be used, there also exists difficulty in making a larger-sized optical switch array because there is a limit in size in manufacturing a PLZT crystal and the largest size of such a crystal is typically a few centimeters by a few centimeters at most. Moreover, electrodes to be used are complicated in structure and thus manufacture thereof is difficult. Further, a relatively high driving voltage ranging from 80 to 250 volts is required. It should also be noted that provision of input and output polarizers is required similarly with the magnetooptic case.

SUMMARY OF THE INVENTION

The disadvantages of the prior art are overcome with the present invention and an improved optical switch array is herein provided.

Departing from the prior art concept of utilizing either the magnetooptic or electrooptic effect of a crystalline material, the present invention is based on the novel idea of utilizing the temperature dependent characteristics of the index of refraction of a crystalline material. In accordance with the present invention, there is provided a substrate having a main surface in which a plurality of waveguides for transmitting light waves are defined in parallel and spaced apart from one another. A discontinuity is defined in the middle of each of the waveguides and the discontinuity is filled with a material having the index of refraction which varies with temperature. The filling material may be preferably of a material forming the substrate and its index of refraction at normal temperature is lower than that of the waveguide; on the other hand, when heated, the index of refraction of the filling material increases to the value comparable to that of the waveguide thereby optically coupling the paired, separate waveguides arranged in a line. In order to selectively heat the discontinuous sections as described above, provision is made of a like plurality of heating elements such that each heating element is disposed to heat the corresponding discontinuous section when selected for operation. In this manner, there is formed a single array of optical switches, made in principle of an array of waveguides, which may be selectively turned on or off in accordance with an electrical image signal supplied to the heating elements.

Preferably, a plurality of heating elements are grouped into a desired number of blocks in each of which the heating elements are commonly connected at one end. The commonly connected end of each of the blocks is connected to a single driver, preferably comprised of a shift register, which carries out block-to-block driving in sequence. While a block is being activated, the heating elements belonging thereto are selectively operated to produce heat. It is also preferable to provide a diode in series with each of the heating elements so as to prevent the heating elements from being activated by stray current.

It is therefore a main object of the present invention to provide an improved optical switch array.

Another object of the present invention is to provide an optical switch array which is not limited in size in manufacture.

A further object of the present invention is to provide an optical switch array which may be driven at low power.

A still further object of the present invention is to provide an optical switch array which is simple in structure and thus easy to manufacture.

Other objects, advantages and novel features of the present invention will become apparent from the following detailed description of the invention when considered in conjunction with the accompanying drawings.

BRIEF DESCRIPTION OF THE DRAWINGS

FIG. 2 is a perspective view showing an optical switch array embodying the present invention;

FIGS. 2a through 2c are schematic illustrations showing the detailed structure at the circled portions indicated in FIG. 2;

DESCRIPTION OF THE PREFERRED EMBODIMENTS

A dielectric crystalline material such as glass and LiNbO$_3$ has a more or less temperature dependent index of refraction such that the index of refraction increases as the temperature increases. For example, in the temperature range between 0°–100° C., the coefficient of temperature dependent index of refraction is $10^{-5}$/°C. for glass and $5\times10^{-5} - 6\times10^{-5}$/°C. for a single crystal of LiNbO$_3$, and therefore the index of refraction increases by the amount of $10^{-3}$ when the temperature of glass is increased by 100° C.

Figure 1A:
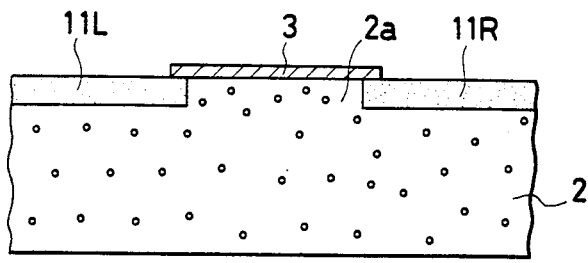
FIGS. 1a through 1c are schematic illustrations useful for explaining the basic principle of the present invention.
Figure 1B:
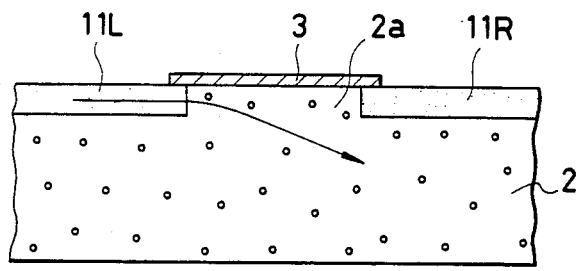
Figure 1C:
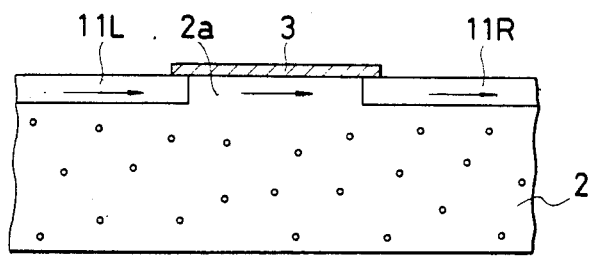

The present invention has been made on the basis of the above-described premise, and now the principle of optical switching operation of the present invention will be described with reference to FIGS. 1a through 1c. As shown in FIG. 1a, a glass substrate 2 has a main surface defined by its top surface and paired waveguides 11$_L$ and 11$_R$ are formed in a line in the main surface with a predetermined gap therebetween. The waveguides are preferably made by having Na$^+$ ions existing in the top surface region of the substrate 2 substituted by Ag$^+$ ions or K$^+$ ions. That portion of the substrate 2 substituted by Ag$^+$ ions becomes increased in index of refraction by $2\times10^{-2} - 6\times10^{-2}$; on the other hand, the index of refraction is increased by $4\times10^{-3} - 6\times10^{-3}$ in the case of substitution by K$^+$ ions. In this manner, those substituted portions of the substrate 2 come to possess a higher index of refraction as compared with the remaining portion so that those substituted portions define waveguides in which light waves may be transmitted as confined therein. A heating electrode 3 is provided on the main surface of the substrate 2 extending between the opposed end portions of the paired wawveguides 11$_L$ and 11$_R$ such that end portions of the heating electrode 3 overlap the corresponding end portions of the waveguides 11$_L$ and 11$_R$, respectively.

It is to be noted that the intermediate region 2a between the opposed waveguides 11$_L$ and 11$_R$ is filled with the material which forms the substrate 2, and, therefore, the intermediate region 2a has a lower index of refraction than the waveguides at normal temperature condition; however, when the intermediate region 2a is heated by the heating electrode 3, the index of refraction of the intermediate region 2a suddenly becomes comparable in value with that of the waveguides so that the discontinuous, paired waveguides 11$_L$ and 11$_R$ are now optically coupled thereby allowing transmission of light waves from the left waveguide 11$_L$ to the right waveguide 11$_R$. For example, the normal temperature condition is illustrated in FIG. 1b. In this instance, since the intermediate region 2a has a lower index of refraction than the waveguides 11, the light waves advanced along the waveguide 11$_L$ are mostly scattered when they enter the intermediate region 2a as indicated by the arrow. Accordingly, light waves are scarcely transmitted to the right waveguide 11$_R$ and thus the optical off condition is established.

On the other hand, if current is supplied to the heating electrode 3, the heat produced by the electrode 3 is applied to the intermediate region 2a so that the index of refraction of the intermediate region 2a becomes increased. As a result, the heated intermediate region 2a now forms a temporary waveguide which optically connects the paired waveguides 11$_L$ and 11$_R$ as shown in FIG. 1c. Under the condition, light waves may be mostly transmitted from the inlet waveguide 11$_L$ to the outlet waveguide 11$_R$ so that the optical on condition is now established. Thus light waves of high intensity may be obtained at the exit end face of the outlet waveguide 11$_R$.

As described above, there may be formed an optical switch which is turned on or off by controlling the supply of current to the heating electrode 3. Therefore, by arranging a plurality of such optical switches in a single array and providing means for selectively supplying driving current to the heating electrodes, there may be formed an optical switch array which may be operated at high speed to produce a spatial light column signal to be applied to a photosensitive medium for recording. The switching time of the present device may be made shorter than 1 msec. depending upon the shape and material of the waveguides and heating electrode.

Referring now to FIG. 2, an embodiment of the present switch array device will be described in detail. As shown, the present optical switch array 1 includes a substrate 2 comprised of glass in the shape of a rectangular body. The top surface of the substrate 2 defines a main surface in and on which components of the present device are formed. For example, on the main surface are formed a plurality of heating electrodes 3 spaced apart from one another in a parallel arrangement. A pair of leads 4a and 4b are provided as connected to opposite ends of each of the heating electrodes 3. A plurality of common electrodes 7 are also provided on the main surface of the substrate 2 arranged in a line and spaced apart from each other and away from the leads 4a over a predetermined distance. Also provided is a plurality of film carriers 5 on which diode arrays 6 are fixedly mounted. The film carriers 5 include printed leads for establishing electrical connection between the leads 4a and the corresponding common electrodes 7. There is also provided a flexible tape 8 on which leads are printed in a predetermined pattern for establishing electrical connection between the leads 4b and external driving source.

FIG. 2a is a partial plan view showing the detailed structure of the encircled portion of the present device shown in FIG. 2, and FIG. 2b is its cross-sectional view. As shown, in the main surface of the substrate 2 is defined a plurality of paired channels or waveguides 11$_L$ and 11$_R$ which are arranged in a line but disconnected over the distance L$_2$ to define an intermediate region 2a by a portion of the substrate 2. A plurality of paired waveguides 11$_L$ and 11$_R$ are arranged in parallel and spaced apart from one another, and the waveguides extend in the direction perpendicular to the longitudinal direction of the substrate 2. On the main surface of the substrate 2 is formed a buffer layer 12 which is preferably comprised of silicon dioxide. Then a plurality of heating electrodes 3 are formed in parallel on the buffer layer 12 in the form of strips having the width 1$_1$. These heater strips 3 are preferably comprised of a Ni-Cr alloy. Moreover, on each of the heater strips 3 is formed paired leads 4a and 4b which are spaced apart from each other over a distance L$_1$ with its center aligned with the center of the intermediate region 2a having a somewhat shorter length L$_2$. The leads 4a and 4b are comprised of a material having a good electrical conductivity such as Au.

Although the present invention should not be limited to this, one example of the typical dimensions of the present device may be given as follows. The heater strips 3 may be 0.05 microns in thickness, and the leads 4a and 4b may be 0.2 microns in thickness. And the waveguides 11, heater strips 3 and leads 4 all may have the width $l_1$ of approximately 50 microns with the spacing $l_2$ of approximately 30 microns. Since the pitch of the paired waveguides 11 is given by $l_1+l_2=80$ microns, if the length of the substrate 2 is assumed to be 210 mm, then the number of the paired waveguides 11 will be 2,600. Accordingly, under the assumed circumstances, the array will have 2,600 of optical switches arranged in a single line. Preferably, the distance $L_2$ is determined to be approximately 400 microns, and the distance $L_1$ to be approximately 500 microns.

With the above-described structure, when a voltage is applied between the paired leads 4a and 4b, an electric current will be passed through the corresponding heater strip 3 to produce heat which will then be applied to the intermediate region 2a to convert this region into a temporary waveguide thereby optically coupling the paired waveguides $11_L$ and $11_R$ as explained previously. Under the condition, light waves may be transmitted from the inlet waveguide $11_L$ to the outlet waveguied $22_R$ through the intermediate region 2a now functioning as an interlinking waveguide. Although not shown specifically in FIG. 2, the left end face of each of the inlet waveguide $11_L$ defines an entrance to incoming light waves which emanate from an appropriate light source located to the left of the present array 1. On the other hand, a mask 9 provided with a plurality of openings 10 corresponding in number and location to the exits or right end faces of the outlet waveguides $11_R$ is attached to the right end wall of the substrate 2 as shown in FIG. 2c showing the detailed structure of the encircled portion of the device 1. Provision of the mask 9 allows to obtain improved resolution because possible effects of stray light can be eliminated.

Figure 3A:
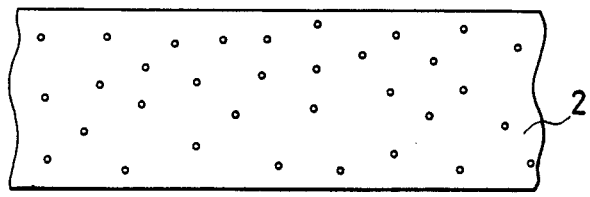
FIGS. 3a through 3g are cross-sectional views taken along III—III line shown in FIG. 2, showing the structure at each step of manufacturing the present optical switch array.
Figure 3B:
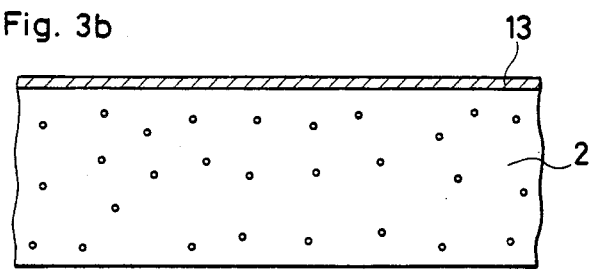
Figure 3C:
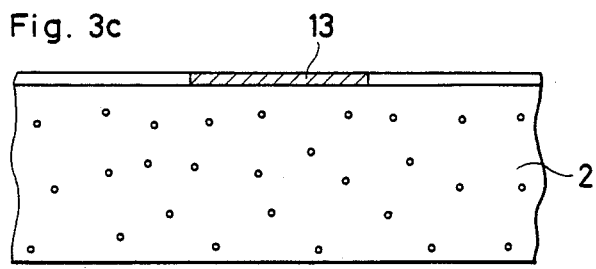
Figure 3D:
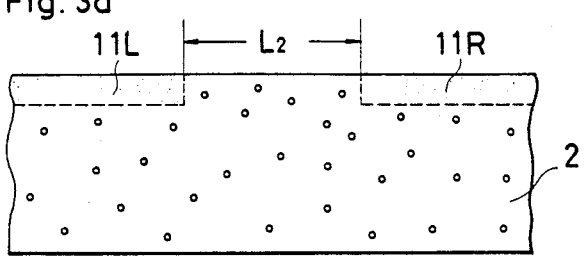

Referring now to FIGS. 3a through 3g and 4a through 4d, a method for manufacturing the present optical switch array 1 will be described. First, as shown in FIGS. 3a and 3b, a layer 13 of Al is formed on the main surface of the substrate 2. Although glass may be used to form the substrate 2 as in this embodiment, any other material which has a temperature dependent index of refraction such as $LiNbO_3$ may also be used. However, glass is preferred because it is less expensive and there is virtually no limit in size in manufacturing the substrate 2. Then, as shown in FIG. 3c in cross-sectional view and FIG. 4a in plan view, those portions of the Al layer 13 that are located above the to-be-formed paired waveguides 11 are etched away. Thereafter, the substrate 2 is dipped into a molten salt including $K^+$ ions contained in a crucible positioned in a constant temperature bath. Thus, those $Na^+$ ions existing in the substrate 2 in the vicinity of the etched-away portions of the Al layer 13 are replaced by $K^+$ ions thereby forming channels or waveguides $11_L$ and $11_R$ as shown in FIG. 3d.

When $KNO_3$ is used as a molten salt, it is desired to maintain the temperature at $345 \pm 1°$ C. during the substituting process. Although the present embodiment is constructed such that the waveguides 11 have the width of 50 microns and the spacing between the adjacent waveguides is 30 microns, resulting in the pitch of 80 microns, as mentioned previously, the present invention should no way be limited to such dimensions and they may take other appropriate values depending upon particular design requirements. With regard to the length $L_2$ of the intermediate region 2a defined between the paired waveguides $11_L$ and $11_R$ arranged in an opposed relation, it affects the SN ratio of the present device, and it generally holds that the longer the length $L_2$ is, the better the SN ratio of the array 1 is. When $L_2$ is set approximately at 400 microns as mentioned previously, the SN ratio of about 20 dBs is obtained and no problems arise practically.

Subsequent to the formation of waveguides $11_L$ and $11_R$ in the main surface of the substrate 2 as shown in FIG. 3d, the remaining portions of the Al layer 13 are all removed. Incidentally, as mentioned previously, the waveguides 11 may also be formed with substitution by $Ag^+$ ions instead of $K^+$ ions; however, the substitution by $K^+$ ions is preferred because streaking of travelling light waves is less noticeable and propagation loss is smaller ranging between 1 and 2 dB/cm.

Figure 3E:
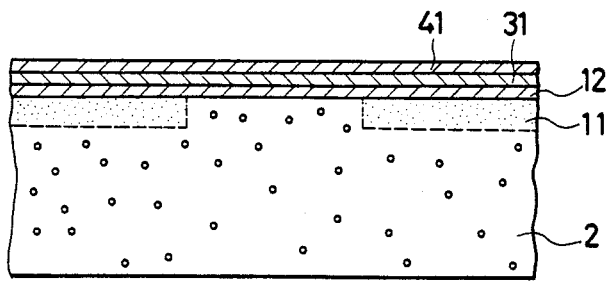

Then, as shown in FIG. 3e, after formation of the paired waveguides 11, a buffer layer 12 is formed on the main surface of the substrate 2 by any well known method such as evaporation and sputtering. The buffer layer 12 may, for example, be comprised of silicon dioxide. Then, a Ni-Cr alloy layer 31 is formed on top of the buffer layer 12 by evaporation or sputtering, followed by the step of forming an Au layer 41 on the Ni-Cr alloy layer 31 by evaporation or sputtering. Thereafter, the Ni-Cr alloy layer 31 and Au layer 41 are selectively etched away to define heater strips 3 and leads 4a and 4b, respectively. The buffer layer 12 is preferably provided to be 0.2–0.5 microns thick to avoid direct contact between a metal such as heater strips 3 and light waves travelling in the waveguides 11 in order to prevent the travelling light waves from being decreased in intensity.

It is preferable to form the Ni-Cr alloy layer 31 such that each of the heater strips 3 has the resistance of 100s of ohms to 1,000 ohms when the alloy layer 31 is etched into the strips 3, each having the width $l_1$ of 50 microns, and thus the alloy layer 31 may have the thickness in the neighborhood of 0.05 microns. Instead of using Ni-Cr alloy, use may be equally made of $Ta_2N$, Ta-Si, Ta-$SiO_2$, $RO_2$, or the like. The Au layer 41 provides a good electrical conductive layer and it is preferably 0.2 microns thick.

Figure 3F:
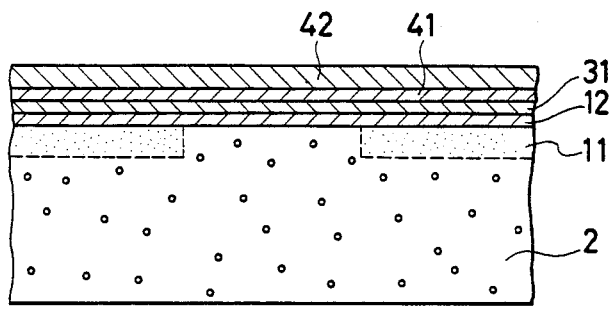

Then, as shown in FIG. 3f, an additional Au layer 42 is electro-deposited onto the Au layer 41. As will be described later, provision of such an electro-deposited Au layer 42 is required for mounting the film carriers 5 and flexible tape 8 on the substrate 2 by means of thermocompression bonding, and the thickness of such a deposition layer may range from 2 to 5 microns. Alternatively, use may be made of solder, Sn, Ni, and the like in forming such an electro-deposited layer 42, in which case, the Au layer 41 may be dispensed with and the electro-deposited layer 42 may be formed directly on the Ni-Cr alloy layer 31. In the case where the Au layer 41 is not formed, the electro-deposited layer 42 assumes the role of the leads 4a and 4b.

Figure 3G:
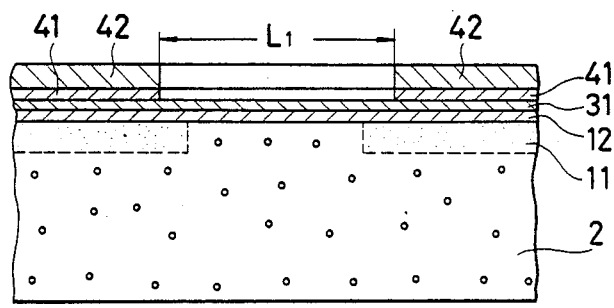
Figure 4A:
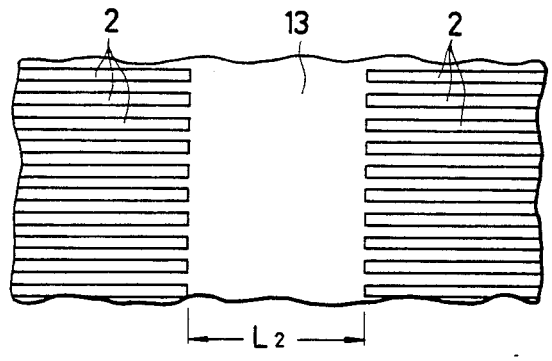
FIGS. 4a through 4d are plan views also showing the steps of manufacturing the present optical switch array.
Figure 4B:
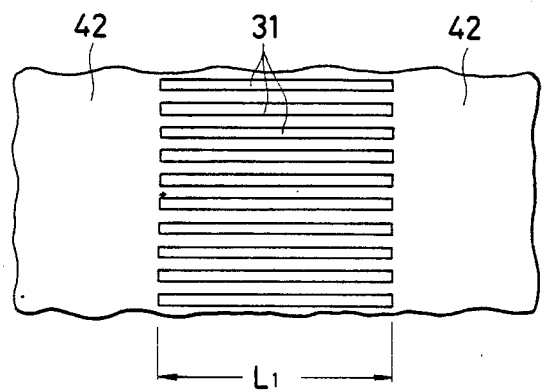
Figure 4C:
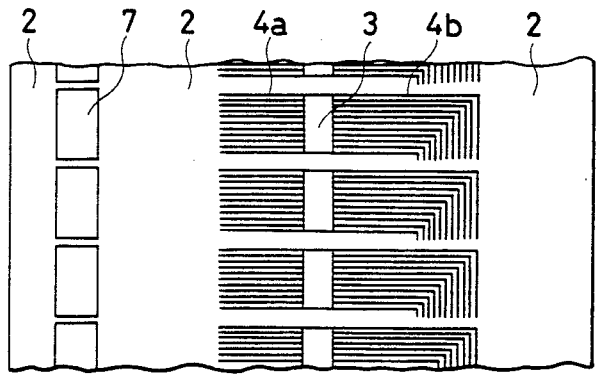

Thereafter, as shown in FIGS. 3g and 4b, the electro-deposited Au layer 42 and the underlying evaporated Au layer 41 are selectively etched to define rectangular recesses having the length $L_1$ which is somewhat longer than $L_2$. Then, as shown in FIG. 4c, the electro-deposited Au layer 42, evaporated Au layer 41 and Ni-Cr alloy layer 31 are selectively etched to define a desired lead pattern. It is to be noted that the structure shown in FIG. 4c is reduced in scale as compared with the structures shown in FIGS. 4a and 4b. The heater strips 3 are, in fact, formed in the form of parallely arranged strips each having the width $l_1$ as best shown in FIG. 2a; however, all of the heater strips 3 belonging to the same groups are shown by blocks for the sake of simplicity. The leads 4a extend straight to the left from the heater strips 3; on the other hand, the leads 4b include first sections extending straight to the right from the heater strips 3 and second sections extending perpendicularly to the bottom from the tip ends of the corresponding first sections. To the left of the leads 4a are formed a plurality of common electrodes 7 arranged in a line spaced apart from one another.

Figure 4D:
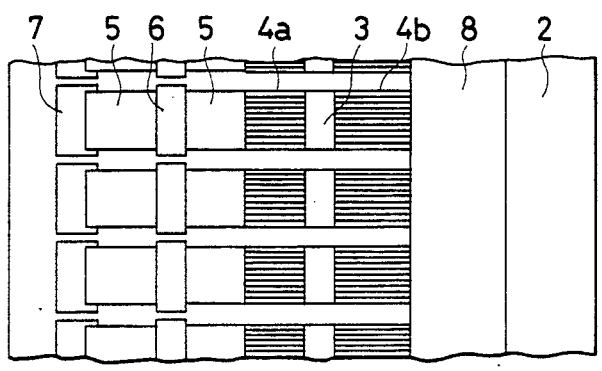

Then, as shown in FIG. 4d, the flexible tape 8 of polyimide is bonded to the substrate 2 by means of thermocompression bonding such that the interconnection lines formed on the tape 8 are connected to the respective leads 4b of the substrate 2. Then, film carriers 5 of polyimide are also bonded to the substrate 2 to establish connection between the leads 4a and the common electrodes 7 thereby completing manufacture of the present optical switch array 1.

Figure 5:
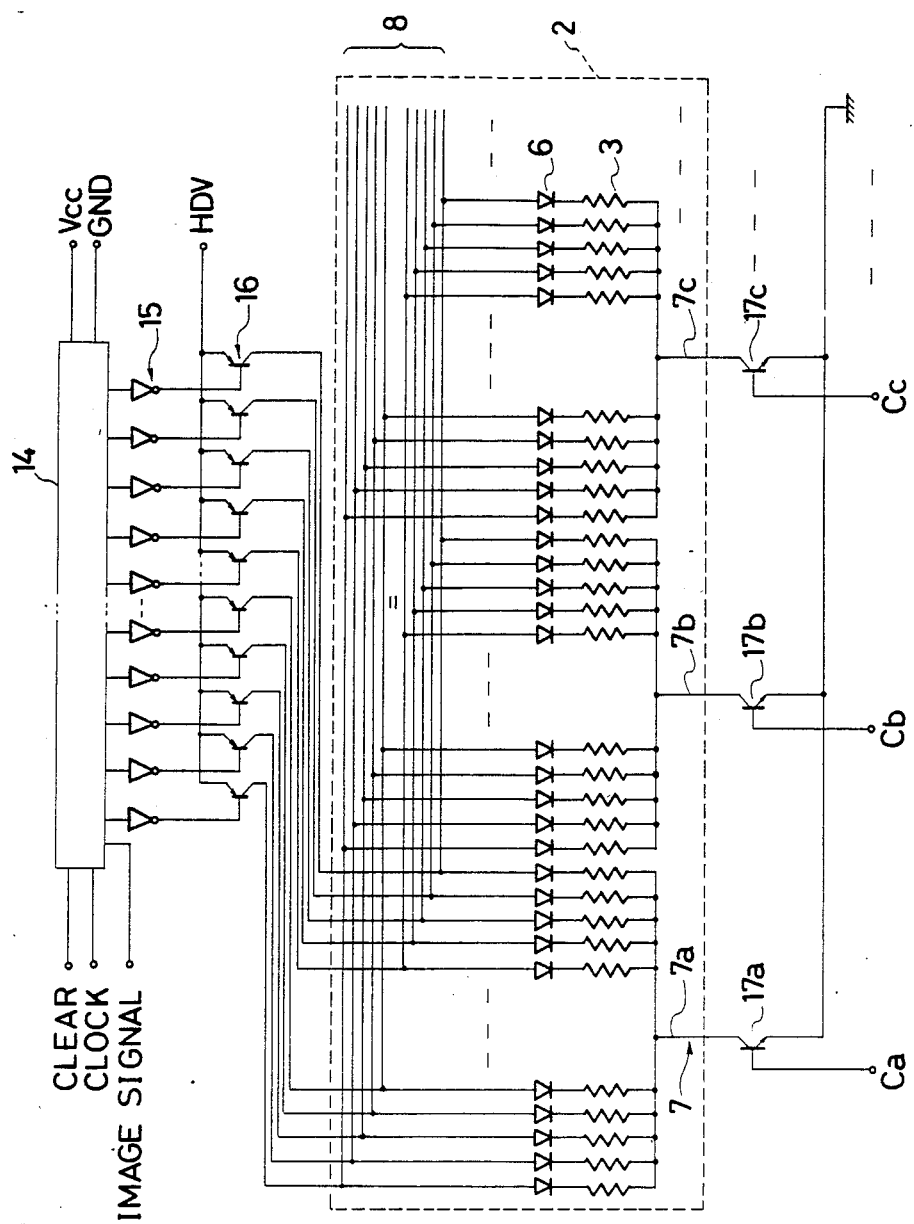
FIG. 5 is a schematic illustration showing the driving structure of the present optical switch array.

Now, the operation of the present optical switch array 1 as structured above will be described with reference to FIG. 5. In FIG. 5, the dotted-line indicates the structure formed on the substrate 2. As shown, the heater elements 3 are grouped into blocks, each of which includes a predetermined number of elements 3. The bottom ends of the heater elements 3 belonging to the same group or block are connected to a common electrode 7, and the top ends of the heater elements 3 form individual electrodes which are connected to the leads of the tape 8 through respective diodes 6. It is to be noted that the heater elements 3 and diodes 6 may be interchanged in position, if desired. That is, the diodes 6 may be provided with their cathodes connected to the corresponding common electrodes 7 and their anodes connected to the bottom ends of the corresponding resistors 3. These diodes 6 are provided to insure that current may pass only through selected resistors 3.

The interconnection lines of the flexible tape 8 are connected to a high voltage source HDV through individual transistor switches 16 which are turned on or off in accordance with signals supplied from a shift register 14 through respective inverters 15. On the other hand, the common electrodes 7a, 7b, 7c, etc. are connected to ground through respective transistor switches 17a, 17b, 17c, etc. which are turned on or off in accordance with control signals Ca, Cb, Cc, etc. which are supplied thereto in association with the operation of the shift register 14.

In operation, only the control signal Ca is first supplied to the transistor 17a thereby holding it to be on to have the common electrode 7a connected to ground. During this period, the remaining switches 17b, 17c, etc. are kept non-conductive. Under the condition, the switches 16 are sequentially scanned by the shift register 14, for example from left to right, during which the switches 16 are selectively turned on in accordance with an image signal stored in the shift register 14. Thus current will pass only through those resistors 3 the corresponding switches 16 of which have been turned on by the image signal during scanning.

Upon completion of a line scanning by the shift register 14, the control signal Ca is turned low to render the transistor 17a non-conductive. Instead, the state of the control signal Cb is turned high to cause the transistor 17b conductive thereby allowing only those resistors 3 connected to the common electrode 7b may be activated by the shift register 14. Thus, during this second period, current may be selectively supplied to the resistors 3 connected to the common electrode 7b in accordance with the image signal supplied to the switches 16 from the shift register 14. In this manner, switches 17a, 17b, 17c, etc. are rendered conductive one at a time for a predetermined time period in sequence, and during each time period, the shift register 14 scans the resistors 3 in one block thereby selectively activating the resistors 3 in accordance with the image signal then stored in the shift register 14. When the resistors or heater elements 3 are selectively activated as described above, the corresponding intermediate regions 2a of the substrate forming a discontinuity between the paired waveguides $11_L$ and $11_R$ as mentioned before are heated to be temporarily converted into waveguides. Therefore, light waves introduced into the inlet waveguides $11_L$ from the left side of the substrate 2 may be transmitted into the corresponding outlet waveguides $11_R$ if the corresponding intermediate regions 2a are selected for heating. The light waves thus transmitted into the outlet waveguides $11_R$ may be taken out through the corresponding openings 10 of the mask as an optical signal bearing image information. In this manner, an electrical image signal can be converted into an optical image signal accurately as well as easily.

Advantages of the present invention include simplicity in structure, particularly of the electrode pattern. Interconnections between components are quite simplified, which implies feasibility of still higher densification of optical switches. Since the substrate may be made of glass and the like, low cost may be maintained and a larger-sized device may be made equally easily. Moreover, driving power may be low and thus power consumption may be kept at low level. Other advantages include the capability of operating with white light and dispensation of inlet and outlet polarizers.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An optical switch array comprising:
a substrate having a main surface, said substrate containing a generally uniform distribution of $Na^+$ ions at least in the vicinity of said main surface;
a plurality of inlet light-transmitting channels formed in said main surface, said inlet light-transmitting channels being arranged in parallel and spaced apart from one another and including entrance end faces at one end and exit faces at the other end whereby desired light waves may be introduced into said inlet light-transmitting channels through said entrace end faces, said inlet light-transmitting channels being defined by having some of said $Na^+$ ions substituted by $Ag^+$ ions or $K^+$ ions;
a plurality of outlet light-transmitting channels formed in said main surface such that each of said outlet light-transmitting channels is in line with the corresponding one of said inlet light-transmitting channels with a predetermined gap therebetween thereby defining an intermediate region between said inlet and outlet light-transmitting channels in said substrate, said intermediate region being comprised of a material having a temperature dependent index of refraction which is normally lower in value than but becomes comparable in value, when heated, to the index of refraction of said channels, said outlet light-transmitting channels being defined by having some of said Na+ ions substituted by Ag+ ions of K+ ions; and means for heating said intermediate regions selectively thereby optically coupling the selected pair of inlet and outlet light-transmitting channels to allow transmission of light waves from said inlet to outlet light-transmitting channels.

2. An optical switch array of claim 1 wherein said material forming said intermediate region is the same material which forms said substrate.

3. An optical switch array of claim 2 wherein said material includes a dielectric crystalline material.

4. An optical switch array of claim 3 wherein said dielectric crystalline material is glass.

5. An optical switch array of claim 1 further comprising a buffer layer formed on said main surface and said heating means includes a plurality of electrically resistive elements formed on said buffer layer and each aligned with the corresponding paired inlet and outlet light-transmitting channels.

6. An optical switch array of claim 5 wherein said buffer layer is comprised of silicon dioxide and said electrically resistive elements are comprised of Ni-Cr alloy.

7. An optical switch array of claim 5 wherein said plurality of electrically resistive elements are divided into a predetermined number of blocks, and said array further comprises said predetermined number of common electrodes formed on said substrate whereby all of the electrically resistive elements belonging to the same block are connected to the same common electrodes.

8. An optical switch array of claim 7 wherein a tape carrier on which interconnection leads are printed is provided to establish electrical connection between all of the electrically resistive elements belonging to the same block and the corresponding common electrode.

9. An optical switch array of claim 8 wherein a diode is connected in series with said electrically resistive element between each of said electrically resistive elements and said corresponding common electrode.

10. An optical switch array of claim 1 further comprising a mask attached to the outlet sidewall of said substrate, said mask being provided with a plurality of openings corresponding in number and location to the exit and faces of said outlet light-transmitting channels.

* * * * *